April 16, 1940.  J. M. HAIT  2,197,377
FRUIT PROCESSING APPARATUS
Filed Jan. 2, 1937   2 Sheets-Sheet 2

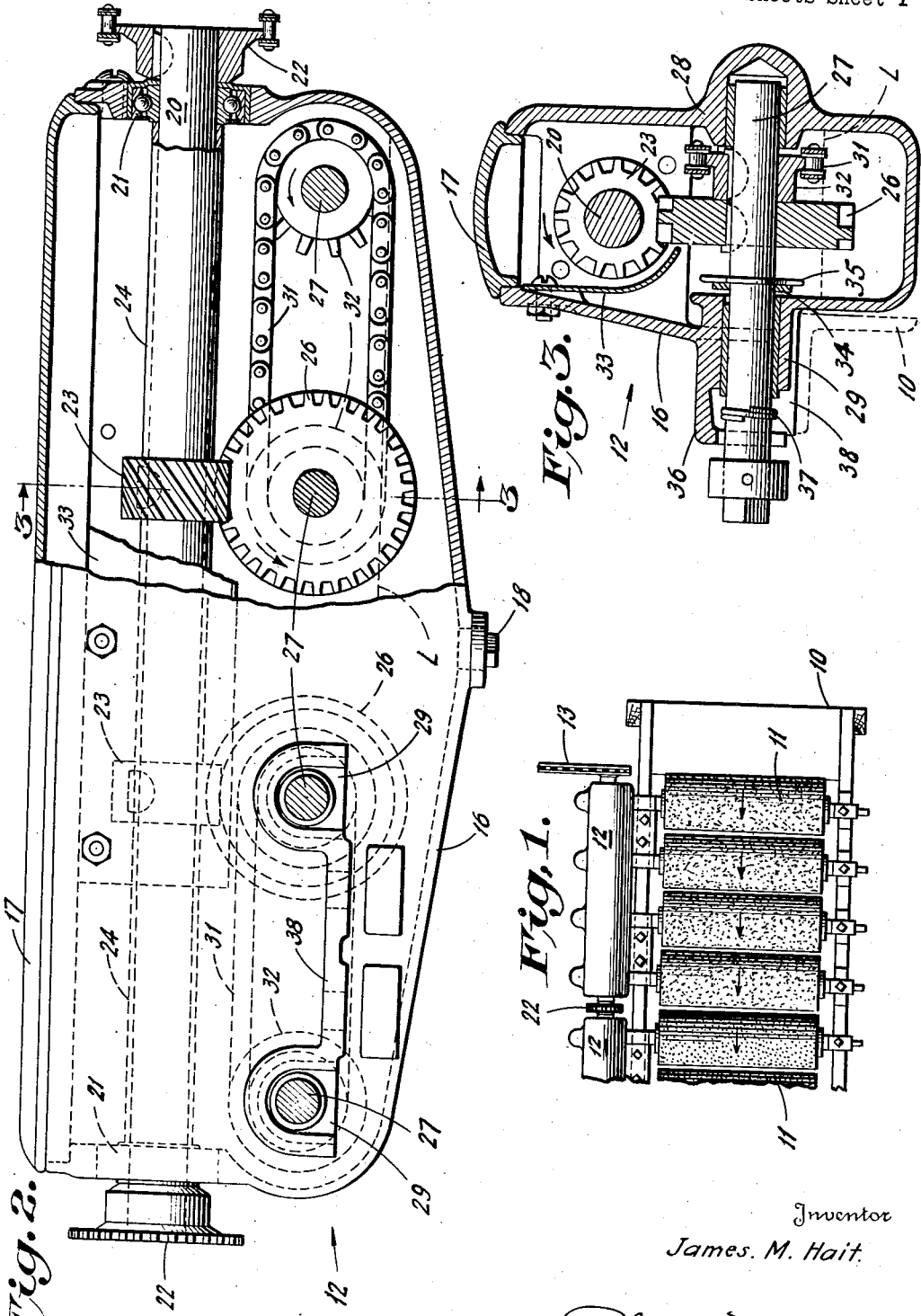

Inventor
James. M. Hait.

By Philip A. Minnie
Attorney

Patented Apr. 16, 1940

2,197,377

UNITED STATES PATENT OFFICE 2,197,377

FRUIT PROCESSING APPARATUS

James M. Hait, Los Angeles, Calif., assignor to Food Machinery Corporation, San Jose, Calif., a corporation of Delaware Application January 2, 1937, Serial No. 118,723

6 Claims. (Cl. 74—223)

The present invention relates to fruit processing machines of the type employing transverse brushes, rolls and the like, and more particularly to the provision of improved drive means therefor.

It is a general object of the invention to provide drive means of the character referred to, which incorporates interchangeable drive units to promote economical assembly of machines of different lengths, and to provide machines which can be disassembled easily for repair or replacement purposes.

Another general object of the invention is to provide drive means of the character referred to of compact and economical construction, and which eliminates lubrication difficulties.

Other objects will appear as the description progresses with reference to the drawings, which illustrate certain preferred embodiments of the invention.

In the drawings:

Fig. 1 is a schematic plan view of a part of a fruit processing machine embodying the invention.

Fig. 2 is a side elevation of one form of drive unit embodying my invention, the view being shown partly in section to illustrate certain details of construction.

Fig. 3 is a vertical transverse sectional view of the drive unit of Fig. 2, the view being taken through the axis of one transverse drive shaft as indicated by the line 3—3 in Fig. 2.

Figure 4:
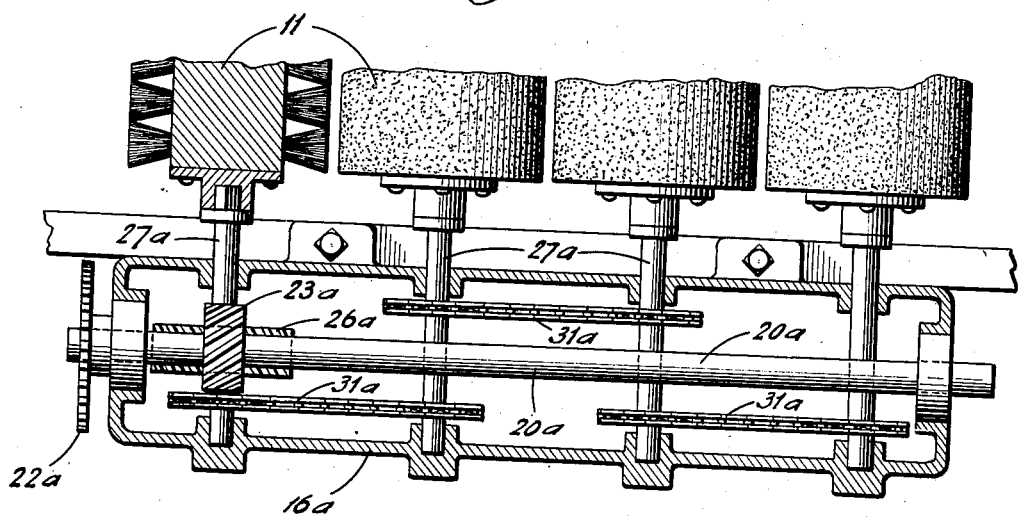
Fig. 4 illustrates somewhat schematically a second form of drive unit embodying my invention, and is a horizontal sectional view of the drive unit taken through the axis of the longitudinal drive shaft, the adjacent ends of the associated transverse brushes being shown.

Generally, my invention contemplates the provision of one or more interchangeable drive units for fruit processing equipment of the type employing transverse brushes or rolls, such as are commonly used in washing, brushing, drying, and polishing fruit.

Preferably, each drive unit embodies an oil retaining case in which a longitudinal or main drive shaft and a plurality of transverse or brush drive shafts are journalled, the drive between the shafts being transmitted by both gear type, and chain and sprocket type drive connections as pointed out later in detail.

Referring to Figs. 1 through 3, Fig. 1 illustrates schematically the type of machine with which the drive means of my invention is preferably employed. The machine includes frame 10 on which a series of transverse processing elements or brushes 11 are journalled. As usual in such machines, the brushes are rotated in the same direction to progress fruit or the like transversely thereof, either by the added force of oncoming fruit or by some auxiliary progressing means. Brushes 11 are preferably driven in groups by a series of similar interchangeable drive units 12 which are mounted along one side of the frame and driven through chain 13 from a suitable source of power.

Each drive unit is of compact construction to effect saving in space, and its component parts are arranged to provide an effective silent drive with adequate lubrication of all parts. Each such unit includes elongated oil retaining case 16 (Figs. 2 and 3) which is open at the top and on which cover 17 is suitably secured. The bottom wall of the case slants downwardly from each end to form an oil sump which may be drained by removing plug 18.

Longitudinally extending main drive shaft 20 (Fig. 2) is journalled in the end walls of the case by double shielded grease packed bearings 21, and on its projecting ends is provided with drive elements 22 for connection to an adjacent drive unit. The drive elements may be in the form of half sprockets which, when placed in end to end relation with a complementary half sprocket, may be connected by means of a chain. Within the case, shaft 20 carries one or more spiral pinions 23 keyed thereon between sleeve spacers 24. In the form of the invention shown in Fig. 2, two pinions 23 are provided which mesh with spiral gears 26 on the two central transverse brush drive shafts 27. In the embodiment shown, four such shafts 27 are provided, each of which is journalled by suitable bushings in aligned bosses 28 and 29 in the opposite side walls of the case as shown in Fig. 3.

As illustrated, only certain of the transverse shafts have gear type drive connections with the longitudinal drive shaft, the remainder of the transverse drive shafts, including right hand shaft 27 as viewed in Fig. 2, being driven by chain and sprocket type drive connections including chains 31 and sprockets 32 from the adjacent shafts 27. I prefer that end shafts 27, and especially right end shaft 27 of Fig. 2, be chain and sprocket driven to provide compactness, as sprockets 32 are of smaller diameter than gears 26, so that the case can be made shorter and allow more room for the drive connections between adjacent units. Also, the chain and sprocket drive requires less lubrication, so that if the drive unit is inclined, sufficient oil will be carried by the chain to the higher sprocket with a much lower oil level than required if a gear type drive were provided at such higher end.

All of brush drive shafts 27 are rotated in the same direction as indicated by the arrows, and it will be noted that sprocket 32 on the right end shaft 27 has its periphery travelling up adjacent the case, so that oil, particularly if the oil level is too high, will tend to accumulate between such sprocket 32 and the end wall of the case. However, because of the relatively low speed of travel of the sprocket teeth (as compared with a larger gear) and because the sprocket is positioned below bearing 21, the oil will not accumulate to such an extent as to flow into the bearing and remove the grease which is packed therein. Preferably, the oil level indicated at L in Figs. 2 and 3, should be maintained substantially at or below the lower stretches of the chains 31, and high enough so that oil will be picked up by gears 26 to insure lubrication between gears 23 and 26. It will be noted that oil will be thrown from the gears 23 onto the chains 31 to insure lubrication thereof.

To prevent egress of oil from the case around shaft 27 through bosses 29, oil shield 33 is detachably mounted within the case to receive oil thrown from pinions 23 and deflect such oil away from bosses 29. In addition, an oil deflecting ring 34 (Fig. 3) is positioned on each shaft 27 adjacent boss 29 by means of a spring retaining clip 35 engaging a recessed groove in the shaft.

When the drive unit is used to drive the brushes of a washing machine or the washing section of a machine, it is preferable to extend bosses 29 to provide semicylindrical shrouds 36 above shafts 27, and to provide water deflecting rings 37 on the shaft under the shrouds to prevent entry of water into the case along the shafts 27. If desired, adjacent shrouds 36 may be connected by integral flange 38 which is apertured to receive the connecting bolts to frame 10.

Figure 5:
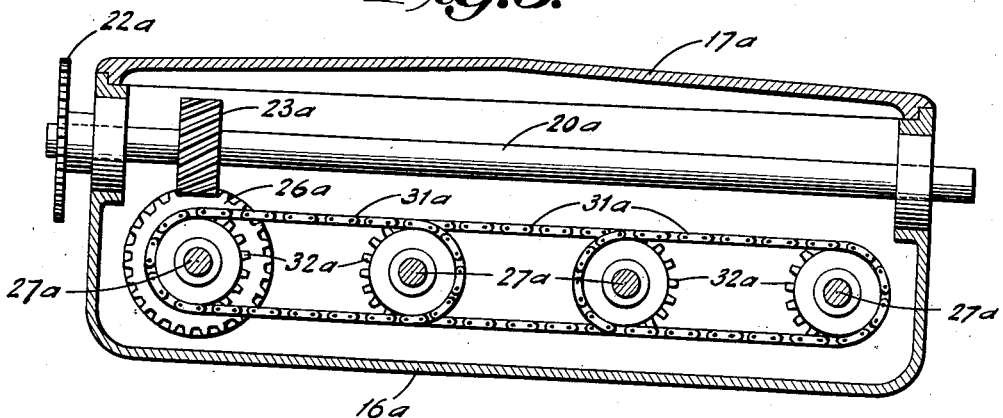
Fig. 5 is a vertical longitudinal section of the drive unit shown in Fig. 4.

The drive unit illustrated in Figs. 4 and 5 is generally similar to that described above and is only shown somewhat schematically, but may be of identical construction in so far as the case is concerned. In this drive unit, longitudinal main drive shaft 20a is similar to shaft 20 and similarly mounted in case 16a. Shaft 20a is connected by pinion 23a with gear 26a on left end shaft 27a, the remaining shafts 27a being driven therefrom by successive chains 31a and sprockets 32a. It is to be noted that in this modification, as in the one first described, fewer than all the transverse drive shafts are driven by gear type connections from the longitudinal drive shaft, the remaining shafts including the right end shaft 27a being driven by chain and sprocket type connections from the gear driven shaft.

While I have shown and described certain preferred embodiments of my invention, it is to be understood that such invention can be embodied in other forms, and is to be limited, therefore, only by the scope of the appended claims.

I claim:

1. A drive assembly, comprising a case, a main drive shaft extending longitudinally through said case and journalled therein, a plurality of auxiliary drive shafts extending transversely of said case and journalled therein, said auxiliary drive shafts having similar ends projecting through one side of said case, and drive elements on the projecting ends of said main shaft for flush abutting relation with adjacent similar drive elements of adjacent similar drive assemblies, whereby a drive unit can be removed without disturbing said adjacent drive units.

2. A drive means comprising a plurality of drive units, each unit including a case, a longitudinal drive shaft having its ends extending through the case for connection to the similar shafts of adjacent units, and drive couplings on the projecting ends of said drive shaft for flush abutting relation to the similar couplings of adjacent drive units, whereby a drive unit can be removed without disturbing said adjacent drive units.

3. A drive means comprising a plurality of drive units, each unit including a case, a longitudinal main drive shaft having its ends extending through the case for connection to the similar shafts of adjacent units, the projecting ends of said main shaft of each unit being provided with flush abutting drive elements, whereby a drive unit can be removed without disturbing said adjacent drive units, flexible means for coupling said abutting drive elements of adjacent drive units, each unit also including a plurality of auxiliary drive shafts journalled in said case and driven from said main shaft, said auxiliary drive shafts having similar projecting ends from one side of said case.

4. A drive assembly comprising a case; a main drive shaft extending longitudinally through said case and journalled therein; a plurality of auxiliary drive shafts extending transversely of said case and journalled therein, said auxiliary drive shafts having similar ends projecting through one side of said case; means for driving said auxiliary drive shafts in the same direction from said main shaft comprising a gear connection between said main shaft and fewer than all said auxiliary drive shafts, and a chain and sprocket drive connection from said gear driven auxiliary drive shafts to the remainder of said auxiliary drive shafts, and drive couplings on the projecting ends of said main drive shaft for flush abutting relation to similar couplings of adjacent drive units, whereby a drive unit can be removed without disturbing said adjacent drive units.

5. A drive assembly comprising a case; a main drive shaft extending longitudinally through said case and journalled therein; a plurality of auxiliary drive shafts extending transversely of said case and journalled therein, said auxiliary drive shafts having similar ends projecting through one side of said case; and means for driving said auxiliary drive shafts in the same direction from said main shaft, comprising a gear connection between said main shaft and fewer than all said auxiliary drive shafts, a chain and sprocket drive connection from said gear driven auxiliary drive shafts to the remainder of said auxiliary drive shafts including the end auxiliary drive shaft having its periphery moving up adjacent an end wall of said case, and drive couplings on the projecting ends of said main drive shaft for flush abutting relation to similar couplings of adjacent drive units, whereby a drive unit can be removed without disturbing said adjacent drive units.

6. A drive assembly, comprising a plurality of adjacent drive units, each unit including a case, a main drive shaft having its ends extending through the case, a plurality of auxiliary drive shafts driven by said main shaft and journalled in said case and extending therefrom, the projecting ends of the main drive shafts of adjacent units being provided with complementary sprocket wheels in flush abutment relative to each other, and a sprocket chain common to said sprocket wheels and trained around their peripheries for coupling the main drive shafts of adjacent units.

JAMES M. HAIT.